United States Patent [19]

Ogino et al.

[11] Patent Number: 5,070,281
[45] Date of Patent: Dec. 3, 1991

[54] DISPLAY HAVING AUTOMATIC CORRECTION DEVICE FOR HORIZONTAL DEFLECTION DISTORTION

[75] Inventors: Masanori Ogino; Takeo Yamada; Miyuki Ikeda, all of Yokohama, Japan

[73] Assignee: Hitachi, Ltd., Tokyo, Japan

[21] Appl. No.: 525,667

[22] Filed: May 21, 1990

[30] Foreign Application Priority Data

May 29, 1989 [JP] Japan .................................. 1-132605

[51] Int. Cl.[5] .......................... G09G 1/04; H01J 29/70
[52] U.S. Cl. .................................. 315/370; 315/387; 315/394
[58] Field of Search ................ 315/370, 391, 394, 387

[56] References Cited

U.S. PATENT DOCUMENTS

| | | | |
|---|---|---|---|
| 4,414,494 | 11/1983 | Schmidt | 315/395 |
| 4,795,946 | 1/1989 | Nishiyama | 315/370 |

FOREIGN PATENT DOCUMENTS 0116371 9/1981 Japan .................................. 315/371

Primary Examiner—Gregory C. Issing
Attorney, Agent, or Firm—Antonelli, Terry, Stout & Kraus

[57] ABSTRACT

A CRT display including a horizontal deflection circuit. The horizontal deflection coil supplied with a horizontal deflection signal, with inductance L, has an energy-dissipating coil resistance connected in series and hence a second-order distortion expanding the left-hand side of the picture screen of the display and contracting the right-hand side thereof is produced. In the preset invention, to correct for the second-order distortion, the current flowing through the deflection coil means is detected, the deflection distortion component is extracted from the current, and a deflection distortion correcting current corresponding to the deflection distortion is supplied to an auxiliary coil for correcting the horizontal deflection of the electron beam.

8 Claims, 5 Drawing Sheets

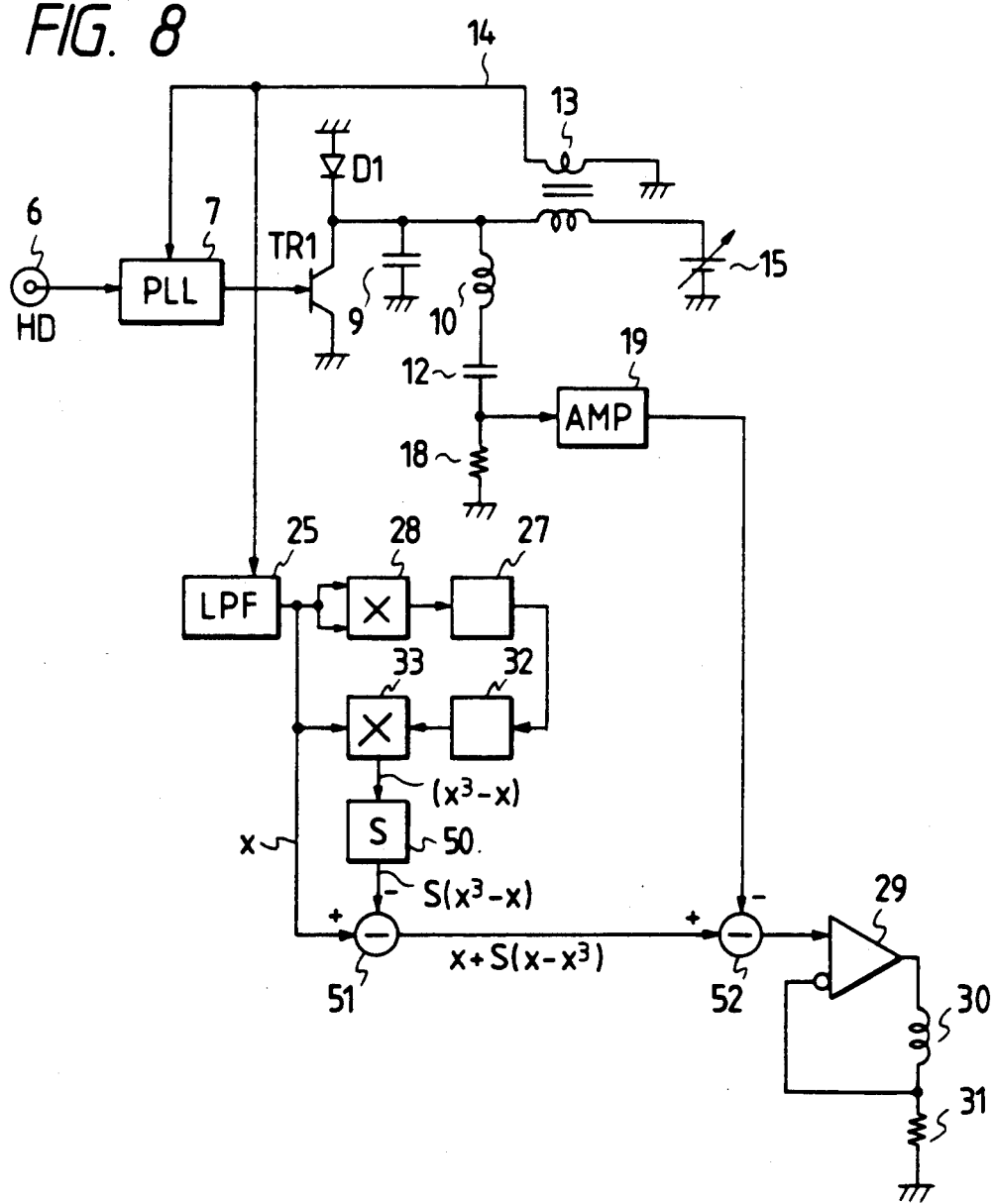

DISPLAY HAVING AUTOMATIC CORRECTION DEVICE FOR HORIZONTAL DEFLECTION DISTORTION

BACKGROUND OF THE INVENTION

The present invention relates to a high definition CRT display having an automatic correction device for horizontal deflection distortions and particularly relates to such a device suitable for use in a multiple scanning type display.

In order to correct horizontal deflection distortions, prior art CRT displays, as described in D. G. Fink, "Television Engineering Handbook", McGraw-Hill, 1957, pp. 15-20, use a horizontal linearity coil utilizing a saturable reactor and an S-shaped capacitor connected in series with the horizontal deflection coil as means for achieving the correction.

The prior art correction means have exhibited good performance when applied to ordinary television receivers, but there arise problems with it when applied to modern high definition display in that its correcting accuracy is insufficient and, in particular, a distortion is generated thereby dependent on the ambient temperature. Further, the prior art correction means when applied to the multiple scanning type display, in which the display must support a plurality of signal sources whose horizontal scanning frequencies are different from one another, the deflection distortion greatly varies with the input horizontal frequency.

SUMMARY OF THE INVENTION

An object of the present invention is to provide a display equipped with apparatus means capable of correcting deflection distortions with high accuracy and is suitable for use in a multiple scanning type display.

According to the present invention, the current flowing through the deflection coil is detected to have a deflection distortion component extracted therefrom and a deflection distortion correcting current corresponding to the deflection distortion is supplied to an auxiliary coil for correcting horizontal deflection of the electron beam.

BRIEF DESCRIPTION OF THE DRAWINGS

FIGS. 7A, 7B, 7C, and 7D are waveform charts showing waveforms at various points in the circuit of FIG. 5;

FIG. 8 is a diagram showing structure of a third embodiment of the present invention;

DETAILED DESCRIPTION OF THE PREFERRED EMBODIMENTS

Figure 1:
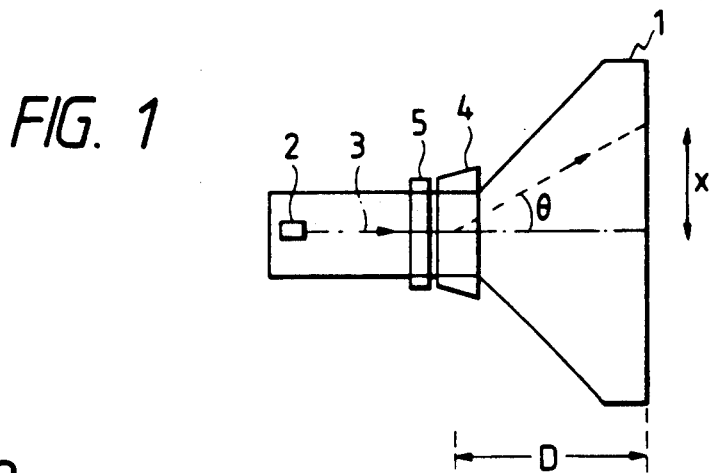
FIG. 1 is a a structural drawing of a CRT and its peripheral portion used in a display as the object of the present invention.

FIG. 1 shows structure of a CRT and its peripheral portion of a CRT display as an object of the present invention. Referring to the figure, reference numeral 1 denotes a CRT, 2 denotes an electron gun, 3 denotes an electron beam, 4 denotes a main deflection coil, and 5 denotes an auxiliary deflection coil. The angle $\theta$ in the figure represents an angle of deflection, x represents a distance of deflection, and D represents the distance from the center of deflection to the picture screen.

As well known, in a system of electromagnetic deflection, the sine of the angle of deflection is in direct proportion to the deflection current I. That is, the following expression holds $$\sin \theta = kI, \quad (1)$$

where k is a proportional constant.

When the screen is flat, the distance of deflection is directly proportional to the tangent of the angle of deflection:

$$\frac{x}{D} = \tan \theta \quad (2)$$

$$\therefore \frac{x}{D} = \tan \{\sin^{-1} kI\} \quad (3)$$

$$\approx kI\left(1 + \frac{k^2 I^2}{3}\right)$$

$$kI = \sin\left(\tan^{-1}\frac{x}{D}\right) \approx \frac{x}{D}\left(1 - \frac{x^2}{3D^2}\right).$$

If units of D and x are so chosen that x becomes $x = \pm 1$ at the left and right ends of the picture screen, the above expression can be transformed into $$DkI \approx x\left(1 - \frac{1}{3D^2}\right) + \frac{x - x^3}{3D^2} \quad (4)$$

That is, there exists a non-linear relationship of third order between the deflecting current I and the distance of deflection x, which is called a third-order distortion. The term $x(1-x^2)$ in expression (4) will hereinbelow be referred to as an S-component (because its waveform is S-shaped), and the coefficient $\frac{1}{3}D^2$ will be referred to as a third-order distortion coefficient.

Figure 2:
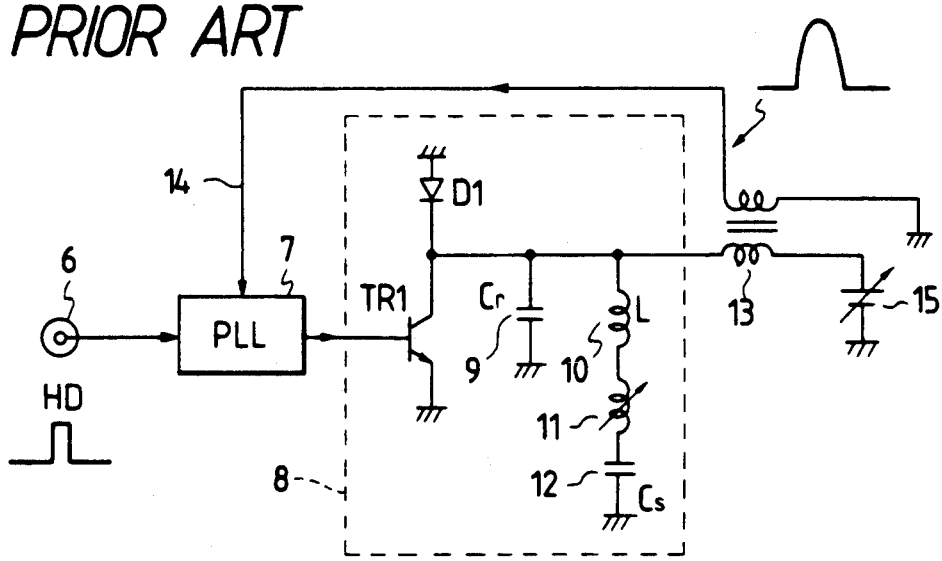
FIG. 2 is a diagram of a prior art horizontal deflection circuit.

FIG. 2 shows a horizontal deflection circuit as the object of the present invention. Referring to the figure, reference numeral 6 denotes a horizontal sync signal input (HD), 7 denotes a horizontal PLL circuit, 8 denotes a horizontal output portion, 9 denotes a resonance capacitor, and 10 denotes a main deflection coil whose inductance is L and represents the winding of the main deflection coil 4 in FIG. 1. Reference numeral 11 denotes a second-order distortion correction coil, 12 denotes a third-order distortion correction capacitor whose capacitance is $C_S$, 13 denotes a choke transformer for power supply, and 14 denotes a flyback pulse (FBP) of the output on the secondary side of the transformer 13. Reference numeral 15 denotes the power supply. The correction amount for the third-order distortion given by the third-distortion correction capacitor 12 is $T_S^2/24 \cdot L \cdot C_S$ in terms of the third-order distortion coefficient. Here, $T_S$ is the horizontal scanning period. The factor $T_S^2$ greatly varies dependent on the horizontal frequency of the signal source and, hence, the residual third-order distortion on the screen becomes very great. As description of the third-order distortion has so far been made, description of the second-order distortion will be given below.

Figure 3:
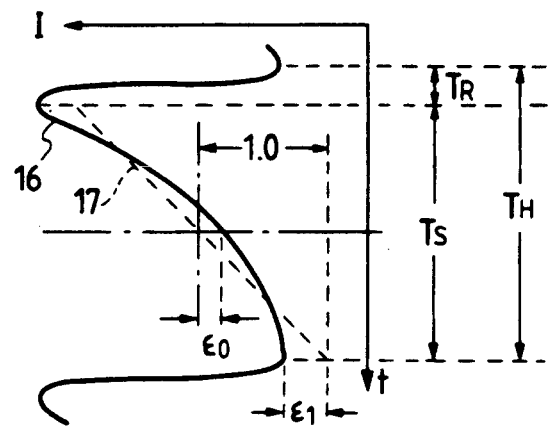
FIG. 3 is an explanatory drawing of the second-order distortion.

Though it is not shown in the figure, there exists an energy-dissipating resistance, or lossy resistance, r in series with the inductance L of the main deflection coil 10. Therefore, the second-order distortion having such a polarity as to expand the left-hand side of the picture screen (the first half of the horizontal scanning) and to contract that on the right-hand side (the latter half) is produced. A situation brought about by the second-order distortion is shown in FIG. 3. In the figure, the axis of ordinate represents time t and the axis of abscissa represents the deflecting current I and the curve 16 indicates the waveform of I(t). $T_H$ represents a horizontal scanning period, $T_S$ represents a scanning period, and $T_R$ represents a flyback period. The dotted line 17 indicates an imaginary sawtooth wave free from the second-order distortion. The figure is depicted such that the amplitude of the current corresponding to the width of the screen is expressed by two unities, that is, half the screen width is normalized as a unity. Represented by $\epsilon_0$ is a distortion of the polarity to shift the picture to the right and that represented by $\epsilon_1$ is a distortion of the polarity to shift both the left and the right ends of the picture to the left by equal quantities. Hereinafter, these shifts will be respectively referred to as "center shift" and "side shift". The distortions $\epsilon_0$ and $\epsilon_1$ are virtually determined by L/r (i, I, time constant $\tau$) of the main deflection coil and the following expressions hold for the distortions. Incidentally, the difference between the waveform 16 and the waveform 17 is a parabolic wave.

$$\epsilon_0 = \frac{T_S}{12\tau} = \frac{\epsilon_2}{3} \quad (5)$$

$$\epsilon_1 = \frac{T_S}{6\tau} = \frac{2\epsilon_2}{3}$$

$$\epsilon_2 \equiv \epsilon_0 + \epsilon_1 = \frac{T_S}{4\tau}$$

where $\tau = \frac{L}{r}$.

The quantity $\epsilon_2$ in the above expression is what is called the second-order distortion. The above expressions can be derived by solving the response current under the conditions where a pulse voltage is repeatedly applied to a circuit of L and r connected in series, making practical approximation that the flyback period $T_r$ is sufficiently smaller than the scanning period $T_S$. Since the value of the lossy resistance r is a function of the ambient temperature and the horizontal frequency, the second-order distortion varies dependent on these factors. The temperature dependency is determined by resistivity of the copper wire of the deflection coil and showed a value as great as 4300 PPM/ °C. or so. The frequency dependency is determined by the eddy current produced in the conductor under a high-frequency magnetic field and there was a tendency that the value r becomes greater as the frequency becomes higher.

Figure 4:
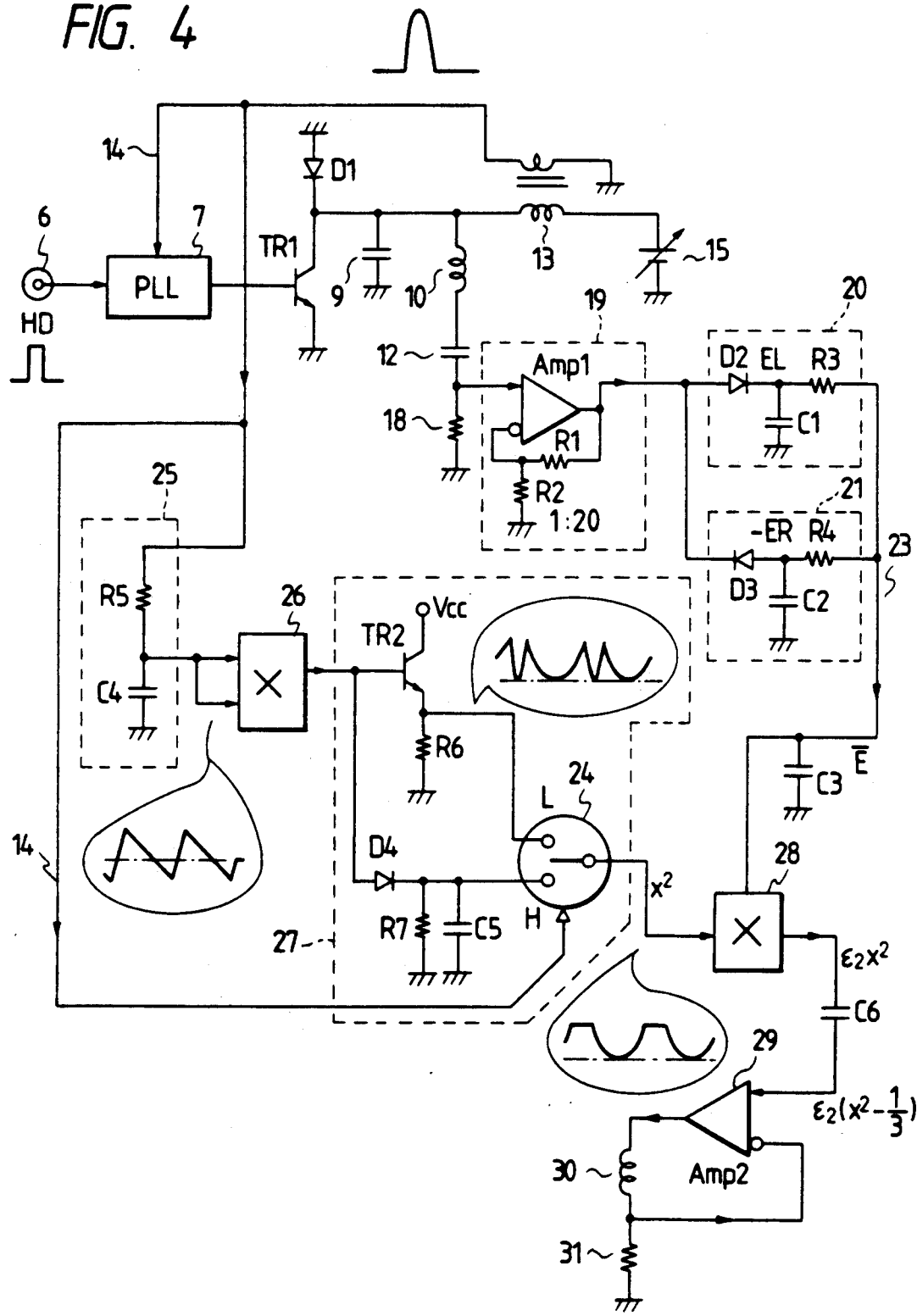
FIG. 4 is a diagram showing structure of a first embodiment of the present invention.

The present invention was made on the basis of physical laws as given in the above expressions (3) to (5). A first embodiment of the invention is shown in FIG. 4. In FIG. 4, the parts denoted by like reference numerals to those in FIG. 2, that is, parts 6 to 15, are corresponding to those in FIG. 2. The essential portion of the present embodiment, for automatic elimination of the second-order distortion, is the parts denoted by reference numerals 18 to 21.

Operation of FIG. 4 will be described below. Reference numeral 18 denotes a resistor for detecting the deflection current. A sawtooth wave at approximately 0.5 $V_{pp}$ is obtained across the resistor. Reference numeral 19 denotes an amplifier whose gain is approximately 20 and provides at its output a sawtooth voltage at approximately 10 $V_{pp}$ proportionate to the deflection current. The small circle on the input side of the amplifier 19 indicates that the input is an phase inverting input. Reference numeral 20 denotes a positive peak detection circuit and its output is represented by $E_L$. Reference numeral 21 denotes a negative peak detection circuit and its output is represented by $-E_R$. At the node 23, average voltage $\bar{E}$ of $E_L$ and $-E_R$ is obtained, $$E = \frac{E_L - E_R}{2}. \quad (6)$$

What should be note here is that the average voltage $\bar{E}$ is proportionate to the side shift $\epsilon_1$ of the above mentioned expression (5) as follows.

$$E_L = 5V(1 + \epsilon_1) \quad (7)$$

$$E_R = 5V(1 - \epsilon_1)$$

$$\therefore E = 5V \cdot \epsilon_1 = \frac{10V}{3} \cdot \epsilon_2.$$

The value $\bar{E}$ is applied to an multiplier 28.

As the multiplier 28, a general purpose analog IC can be used. Reference numeral 25 denotes a low pass filter which has a time constant approximately 20 times as large as the horizontal period and provides a sawtooth wave at its output. Reference numeral 26 denotes a square-law circuit which can be formed of a similar multiplier to the multiplier 28 and provides a parabolic wave at its output. Reference numeral 27 denotes a waveform shaper for bringing the value of the parabolic wave during the flyback period to a constant value. Reference numeral 24 therein denotes a general purpose analog switch. This switch is connected with the "H" side when the control input (FBP) 14 is positive and connected with "L" side when it is negative. As a result, the parabolic wave $x^2$ as shown in the drawing is obtained. This output is multiplied by $\bar{E}$ of expression (7) in the multiplier 28 and $\epsilon_2 x^2$ is obtained at its output. This output is deprived of its direct current portion by a capacitor C6 connected in series and turned into the second-order distortion correcting signal $\epsilon_2(x^2 - \frac{1}{3})$. Since x represents the coordinate of the distance with the left and right ends of the screen set to take unitary values $\pm 1$, the average of $x^2$ is virtually equal to $\frac{1}{3}$. Hence, $\frac{1}{3}$ is subtracted.

The correcting signal is proportionate to the difference between the waveform 16 and the waveform 17 of FIG. 3 and therefore is what has been desired.

The correcting signal is applied to a negative feedback amplifier 29 and allows a current to flow through an auxiliary deflection coil 30. Reference numeral 31 denotes a current detection resistor. Thus, a current proportional to the second-order distortion correcting signal is passed through the auxiliary deflection coil 30. Therefore, the electron beam receives auxiliary deflection action and the second-order distortion on the picture screen is eliminated. The above described correction process achieves the intended correction as understood from the description given above by automatically following up variations in the value of the lossy resistance r of the main deflection coil dependent on the ambient temperature and the horizontal frequency of the signal source. While the second-order distortion $\epsilon_2$ also depends on the horizontal scanning period $T_S$ as shown in expression (5), this dependency is also corrected by the automatic follow-up.

Figure 5:
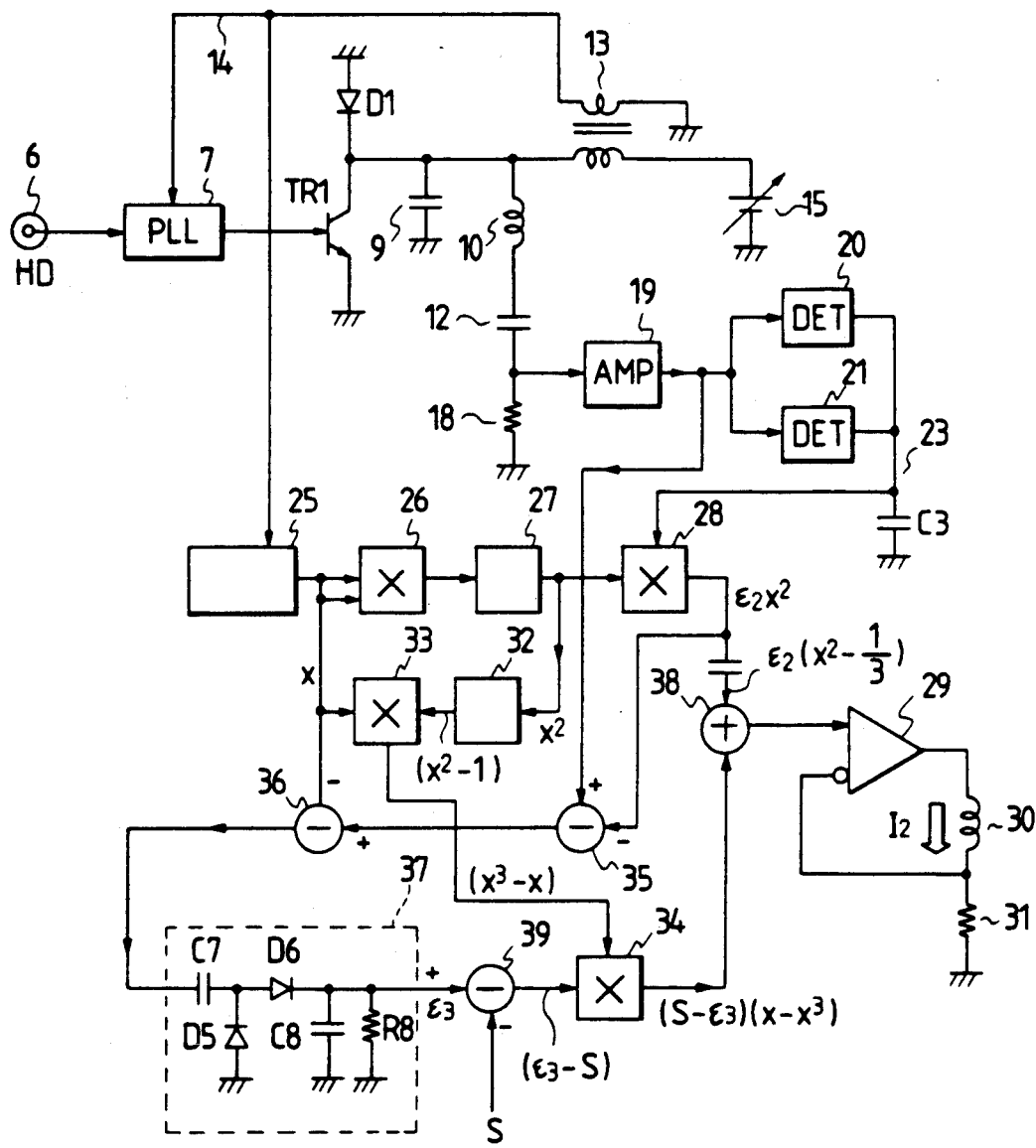
FIG. 5 is a diagram showing structure of a second embodiment of the present invention.

A second embodiment of the present invention is shown in FIG. 5. In this figure, the parts corresponding to those in FIG. 4 are denoted by like reference numerals. The portion including parts 32 to 39 is the essential portion of the present embodiment for eliminating the third-order distortion. Structure and operation of the same will be described below.

Figure 6:
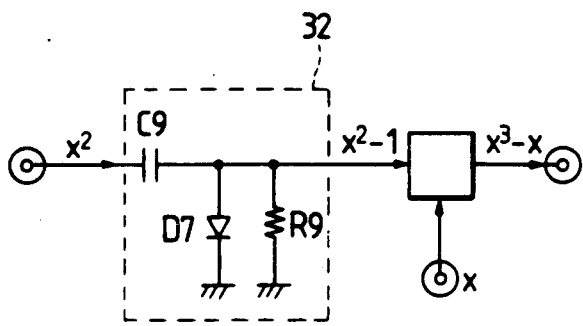
FIG. 6 is a concrete circuit diagram of a level shift circuit shown in FIG. 5.

Reference numeral 32 denotes a peak lump type level shift circuit of which a concrete example is shown in the portion encircled by a dotted line 32 in FIG. 6. The square of an input sawtooth wave signal x (FIG. 7A) is obtained as a signal $x^2$ (FIG. 7B), while a coordinate system with values of x at the left and right ends of the screen normalized to ±1 is adopted. Then, the output of the level shift circuit 32 is represented by $(x^2-1)$ (FIG. 7C). This output is multiplied by another input sawtooth wave x in a multiplier 33 of FIG. 5 and $(x^3-x)$ (FIG. 7D) is obtained at its output and this output $(x^3-x)$ is applied to another multiplier 34.

Referring to FIG. 5, reference numeral 35 is a subtractor which subtracts, from the output of the amplifier 19, i.e, a signal proportional to the deflection current I, the second-order distortion component $\epsilon_2 x^2$ included therein. Therefore, a signal not including the second-order distortion is obtained from its output. However, there remains the third-order distortion therein. The third distortion component is what is due to the capacitor 12. Output of the substractor 35 is applied to another subtractor 36 wherein the sawtooth component x included therein is subtracted. Hence, the subtractor 36 outputs only the third-order distortion component extracted from the deflection current I. This component, as described above, greatly varies in proportion to the square of the horizontal scanning period $T_S$. The amplitude of the extracted third-order distortion component is detected by an amplitude detector 37, and a D.C. voltage $\epsilon_3$ proportionate to the amplitude of the third-order distortion is obtained at its output. This D.C. voltage $\epsilon_3$ greatly varies in proportion to the square of the horizontal scanning period $T_S$. The D.C. voltage is applied to a subtractor 39. The subtractor 39 is also applied with an input S of a constant value independent of $T_S$. The value S is a constant corresponding to the third-order distortion coefficient $\frac{1}{3}D^2$ of equation (4) and not dependent on the horizontal frequency $T_S$ or the like.

The output $(\epsilon_3-S)$ of the subtractor 39 is applied together with the above described signal $(x^3-x)$ to a multiplier 34 so that the product of both the signals, $(S-\epsilon_3)(x-x^3)$, is obtained at its output. This product signal is applied to an adder 38 and then applied, through the above described negative feedback amplifier 29, to the auxiliary deflection coil 30 to drive it.

The current $I_2$ flowing through the auxiliary deflection coil 30 is expressed as $$I_2 \propto \epsilon_2(x^2-\tfrac{1}{3})+S(x-x^3)-\epsilon_3(x-x^3) \qquad (8)$$

The first term of the right-hand side of the above expression has, as described with the first embodiment, the action to correct the second-order distortion of FIG. 3. That is, it shifts the center of the picture screen (x=0) to the left by $\epsilon\tfrac{2}{3}$ and shifts both the left and right ends (x=±1) thereof to the right by $2\epsilon\tfrac{2}{3}$. Thus, the desired correction on the basis of the relationship of expression (5) can be achieved.

The second term of the right-hand side of the above expression corresponds to the last term of the above described expression (4) (s=$\tfrac{1}{3}D^2$). Namely, it is the term for correcting the third-order distortion characteristic of the above described physical laws of electromagnetic deflection. This term is not dependent on the horizontal frequency of the signal source.

The third term of the right-hand side of the above expression is for canceling the correction of the third-order distortion due to the capacitor 12 of FIG. 5. The value of $\epsilon_3$ is approximately given by the following expression as described above $$\epsilon_3 \approx \frac{T_S^2}{24LC_S}. \qquad (9)$$

The magnitude of the $\epsilon_3$ is greatly varied when the horizontal scanning period $T_S$ is changed or switched. However, the variation appears in the main deflection coil 10 of FIG. 5 (reference numeral 4 in FIG. 1) and the auxiliary deflection coil 30 of FIG. 5 (reference numeral 5 in FIG. 1) equally but in opposite polarity and hence cancel each other. Therefore, even if the input horizontal frequency is switched in a multiple scanning type display, the deflection distortion on the picture screen is automatically eliminated.

A third embodiment is shown in FIG. 8. In the figure, the parts denoted by reference numerals 6, 7, 9, 10, 12, 13, 14, 18, 19, 25, 26, 27, 29, 30, 31, 32, and 33 are corresponding to those shown in FIG. 5. The output $(x^3-x)$ of the multiplier 33 is applied to an amplifier 50. The gain S of this amplifier 50 is set to be the value determined by the coefficient of expression (4) given by $$S = \frac{\frac{1}{3D^2}}{1-\frac{1}{3D^2}}. \qquad (10)$$

The output of the amplifier 50 is applied to a subtractor 51 and a reference distortionless signal $(x+S(x-x^3))$ is obtained at its output. This quantity is that which is proportionate to expression (4). Namely, it is an ideal deflection current waveform corresponding to the condition aimed at to eliminate the deflection distortion. This output is applied to a subtractor 52 together with the output of the amplifier 19, i.e. a signal proportionate to the actual main deflection coil current.

Therefore, at the output of the subtractor 52, there is obtained the difference between the ideal waveform and actual waveform, i.e., the deflection distortion correcting signal. The deflection distortion correcting signal allows, through the amplifier 29, a current to flow through the auxiliary deflection coil 30 thereby achieving the deflection distortion correction.

Now, some examples of modifications within the scope of the present invention will be described.

The output $x^2$ of the waveform shaping circuit 27 in FIG. 4 has been described to be generated through an analog calculation, but the same may be digitally generated and then the result may be brought back into an analog signal through a D/A converter.

Also for obtaining the signal $(x^3-x)$ and the reference distortionless signal $\{x+S(x-x^3)\}$ of FIG. 5 and FIG. 8, digitally generated signals may be brought back into analog signals through a D/A converter.

While description of FIG. 4, FIG. 5, and FIG. 8 has been made with the delay times inherent in the amplifier 29 and the like neglected, in the cases of application where neglect of the delay times poses some problem, it can be coped with by inserting into the path a phase advancing circuit or a delay circuit delaying the period corresponding to one horizontal scanning period less the delay time. For example, the purpose can be met in the case of FIG. 4 by advancing the phase of the sawtooth wave signal input to the multiplier 26, and in the case of FIG. 8, by inserting a delay element as described above into the path of the input signal to the amplifier 29.

Further, in the cases of FIG. 4, FIG. 5, and FIG. 8, a linearity coil used in the prior art (denoted by 11 in FIG. 2) may be used in addition to the means according to the present invention.

Figure 9:
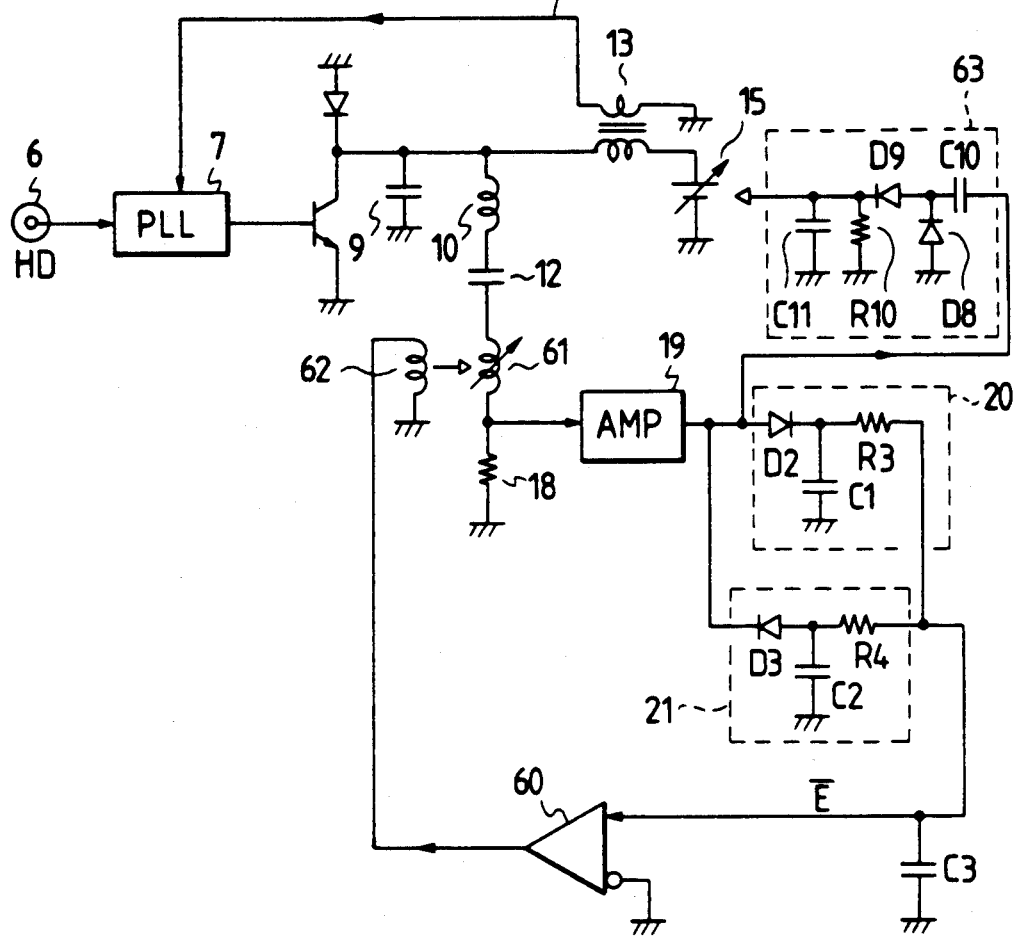
FIG. 9 is a diagram showing structure of a fourth embodiment of the present invention.

A fourth embodiment is shown in FIG. 9. What is shown in FIG. 9 is a system capable of automatic elimination of a second-order distortion without using an auxiliary deflection coil. The essential parts in the figure are those denoted by 60, 61, 62, and 63. Reference numeral 60 denotes an amplifier and its input is applied with the second-order distortion signal $\overline{E}$. Reference numeral 61 denotes a saturable reactor and 62 denotes a winding for controlling the degree of saturation of the saturable reactor. Now, if it is supposed that the signal $\overline{E}$ is increased as the loss in the deflection coil is increased, then the current flowing through the winding 62 is increased and hence the degree of saturation of the saturable reactor 61 is increased. As a result, the quantity of second-order distortion correction increases to thereby decrease the signal $\overline{E}$. That is, the second-order distortion is reduced by action of negative feedback. However, as a side effect of such action, the picture size is somewhat changed.

To correct for the side effect, there is added a detector 63. The detector 63 is that for detecting the peak-to-peak value of the deflection current, or the amplitude of the deflection current, i.e., the size of the picture screen. Dependent on the output of the detector, the variable power supply 15 is controlled, and thereby, the size of the picture screen is kept constant.

Figure 10:
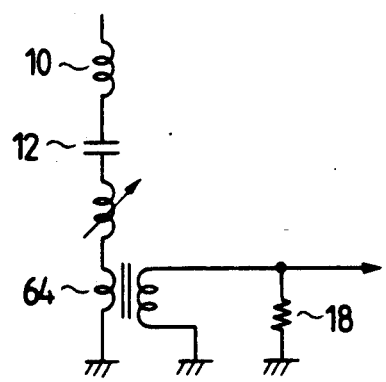
FIG. 10 is a diagram showing structure of a modification of the present invention.

In each of the embodiments of FIGS. 4, 5, 8, and 9, the current detection resistor 18 may be connected via a transformer 64 as shown in FIG. 10. In such case, the amplifier 19 can be omitted if the turn ratio of the transformer is set to around 1:40.

According to the first and second embodiments, deterioration of the picture by the second-order distortion due to the temperature dependency and frequency dependency of the lossy resistance of the main deflection coil can be automatically corrected.

According to the second and third embodiments, both the second-order distortion and the third-order distortion can be automatically eliminated.

Accordingly, a display with a good accuracy of displayed position can be structured.

By magnifying and projecting the picture of the display of the present invention by the use of a projection lens, a projection type display with horizontal deflection distortion automatically corrected can be structured. The present invention is advantageously applicable to such application.

What is claimed is:

1. A CRT display with a horizontal deflection circuit comprising:

deflection coil means for deflecting an electron beam in the horizontal direction;

means for detecting a current flowing through said deflection coil means;

means for detecting a deflection distortion component included in the signal detected by said current detection means; and auxiliary coil means through which a deflection distortion correcting current corresponding to the output of said deflection distortion detection means is flowed for correcting the horizontal deflection of said electron beam caused by said deflection coil means;

wherein said deflection distortion detection means is formed of a detection means of a peak of positive polarity and a detection means of a peak of negative polarity connected in parallel, one terminal of said means connected in parallel being supplied with the detected current from said current detection means and the other terminal thereof providing an average of the peak values of both polarities.

2. The display according to claim 1, further comprising:

means for obtaining a parabolic wave current and means for multiplying the parabolic wave current by the average value of the outputs of said two peak detection means.

3. The display according to claim 2, wherein said means for obtaining a parabolic wave current is formed of a low pass filter for obtaining a sawtooth wave with the horizontal period and means for obtaining the square of the sawtooth wave with the horizontal period as the output of said low pass filter.

4. The display according to claim 2, further comprising means, connected with the output of said means for multiplying the parabolic wave current, for eliminating a direct current component.

5. The display according to claim 1, further comprising:

means for detecting a third-order distortion, wherein the third-order distortion detected by said means for detecting a third-order distortion and the average of the peak values of both polarities are added together so that a deflection distortion correcting current is provided.

6. The display according to claim 2, further comprising:

means for detecting a third-order distortion, wherein the third-order distortion detected by said means for detecting a third-order distortion and the output of said means for multiplying the parabolic wave current are added together so that a deflection distortion correcting current is provided.

7. The display according to claim 5 or 6, wherein said means for detecting a third-order distortion is formed of means for obtaining the square of a parabolic signal, means for multiplying the squared signal by a sawtooth wave, and means for subtracting a second-order distortion component from the output of said means for multiplying the squared signal.

8. A CRT display with a horizontal deflection circuit comprising:

deflection coil means for deflecting an electron beam in the horizontal direction;

means for detecting a current flowing through said deflection coil means;

means for detecting a deflection distortion component included in the signal detected by said current detection means;

auxiliary coil means through which a deflection distortion correcting current corresponding to the output of said deflection distortion detection means is flowed for correcting the horizontal deflection of said electron beam caused by said deflection coil means;

wherein said deflection distortion detection means is constituted of means for subtracting a reference distortionless signal from the detected signal by said current detection means; and means for generating the reference distortionless signal formed of means for obtaining the square of a sawtooth wave signal, means for multiplying the squared signal by a sawtooth signal, means for amplifying the output of said multiplication means, and means for subtracting the sawtooth wave from the output of said amplification means.

* * * * *